United States Patent [19]

Fazekas

[11] Patent Number: 5,235,227

[45] Date of Patent: Aug. 10, 1993

[54] NOISE AND VIBRATION DAMPENED ELECTRIC MOTOR SUCH AS FOR USE WITH A SOUND MOVIE CAMERA

[75] Inventor: Carl F. Fazekas, Tarzana, Calif.

[73] Assignee: Panavision International L.P., New York, N.Y.

[21] Appl. No.: 644,906

[22] Filed: Jan. 23, 1991

[51] Int. Cl.⁵ .................................. H02K 5/24
[52] U.S. Cl. ......................... 310/51; 310/90; 384/202
[58] Field of Search ............... 310/51, 90; 384/196, 384/204, 215, 235, 535, 536, 611, 620

[56] References Cited

U.S. PATENT DOCUMENTS

| | | | |
|---|---|---|---|
| 3,546,504 | 12/1970 | Janssen et al. | 310/51 |
| 3,786,694 | 1/1974 | Willeitner | 74/573 |
| 3,824,416 | 7/1974 | Van de Griend | 310/51 |
| 3,890,514 | 6/1975 | Mutz et al. | 310/49 |
| 3,906,264 | 9/1975 | Kuwako et al. | 310/51 |
| 4,117,359 | 9/1978 | Wehde | 310/67 R |
| 4,145,626 | 3/1979 | Aroshidze et al. | 310/91 |
| 4,317,058 | 2/1982 | Blalock | 310/24 |
| 4,425,813 | 1/1984 | Wadensten | 74/87 |
| 4,494,026 | 1/1985 | Abe | 310/89 |
| 4,597,300 | 7/1986 | Beardmore | 74/5 |
| 4,718,781 | 6/1988 | Gérard | 384/495 |
| 4,758,757 | 6/1988 | Okumura | 310/51 |
| 4,896,236 | 1/1990 | Ghose | 360/106 |
| 5,059,844 | 10/1991 | Anstine | 310/90 |

FOREIGN PATENT DOCUMENTS

| | | |
|---|---|---|
| 650441 | 10/1962 | Canada . |
| 2409856 | 9/1975 | Fed. Rep. of Germany . |
| 2600119 | 7/1977 | Fed. Rep. of Germany ........ 310/15 |
| 2408938 | 8/1979 | France . |
| 0050750 | 3/1984 | Japan ...................... 310/51 |
| 0126876 | 7/1987 | Japan ...................... 310/51 |
| 0087952 | 3/1990 | Japan ...................... 310/51 |
| 1092663 | 5/1984 | U.S.S.R. . |
| 771666 | 4/1957 | United Kingdom . |
| 939508 | 10/1963 | United Kingdom . |
| 972452 | 10/1964 | United Kingdom . |
| 1207145 | 9/1970 | United Kingdom . |
| 1232958 | 5/1971 | United Kingdom . |
| 1500955 | 2/1978 | United Kingdom . |
| 2152295 | 7/1985 | United Kingdom . |

Primary Examiner—Steven L. Stephan
Assistant Examiner—Judson H. Jones
Attorney, Agent, or Firm—Lyon & Lyon

[57] ABSTRACT

A noise and/or vibration damping system for an electric motor such as for use with a sound motion picture camera. In a preferred embodiment the electric motor includes a rotor shaft supported at either end thereof by bearings, a magnetic field assembly fixed to the motor case and concentrically positioned between the rotor shaft and the motor case, an armature winding assembly fixed to the rotor shaft concentrically positioned between the motor case and the magnetic field assembly, wherein the bearing means are supported upon the magnetic field assembly and are vibrationally isolated therefrom by plurality of O-rings concentrically positioned between the bearing means and the magnetic field assembly, the O-rings being axially spaced along the magnetic field assembly.

24 Claims, 2 Drawing Sheets

NOISE AND VIBRATION DAMPENED ELECTRIC MOTOR SUCH AS FOR USE WITH A SOUND MOVIE CAMERA

BACKGROUND OF THE INVENTION

The field of the present invention relates to electric motors, particularly to small electric motors used in equipment such as synchronous sound motion picture cameras, in which it is desireable to minimize the noise and vibration produced by the motor. In the motion picture industry, the electric motor which drives the film advance mechanism is desirably small but requires a relatively high power output. In addition and particularly in a synchronous sound camera, it is highly desirable to minimize noise and vibration produced by the camera to avoid recording the noise on the sound track or transfer vibration to the filming mechanisms.

There have been many attempts to dampen noise and vibration in electric motors. In U.S. Pat. No. 3,546,504, layers of elastic material having high inherent dampen properties are positioned (a) between the motor shaft and the bearings, (b) between the bearings and the bearing flange and (c) within the rotor shaft itself. An additional layer of elastic damping material is also placed between the circumference of the stator lamination packet and the supporting arm.

Similarly, Great Britain Patent No. 1,207,145 discloses an electric motor having a layer of resilient material interposed between the bearing seat and the outer ring of the ball bearing. In the devices of both U.S. Pat. No. 3,546,504 and GB 1,207,145, a layer or sheet of resilient material is positioned between certain parts. However these layers of resilient material must be specially manufactured or cut to size and the motors themselves must be substantially modified in order to accommodate these layers. In addition the amount of damping is highly dependent upon the damping properties of the resilient material itself as well as the thickness chosen for the material In addition, the installation of the layers of resilient material would not be readily implemented upon an existing motor but would likely require design considerations at the manufacturing stage. The present inventor has recognized it would be desireable for an electric motor to be readily modifiable either by the manufacturer or the skilled purchaser.

SUMMARY OF THE INVENTION

The present invention relates to a noise and/or vibration damping system for an electric motor such as for use with a sound motion picture camera. In a preferred embodiment the electric motor includes a rotor shaft supported at either end thereof by bearings, a magnetic field assembly connected to the motor case through an endcap is concentrically positioned between the rotor shaft and the motor case, an armature winding assembly fixed to the rotor shaft concentrically positioned between the motor case and the magnetic field assembly, wherein the bearing means are supported upon the magnetic field assembly and are vibrationally isolated therefrom by plurality of O-rings concentrically positioned between the bearing means and the magnetic field assembly, the O-rings being axially spaced along the magnetic field assembly. Since the O-rings supply the only contact between the bearings and the magnetic field assembly, the motor case is substantially isolated from vibration from the rotor shaft. Though the O-rings are somewhat compressed, they still provide a substantially point contact, and since vibration is transferred between contacting surfaces, the O-rings provide a minimum of surface contact between the bearings and the magnetic field assembly thereby minimizing vibration transmission. The O-rings are constructed from resilient material which itself has damping characteristics. Additional vibration dampening elements are preferably provided at the brush assembly and the shaft.

DETAILED DESCRIPTION OF THE PREFERRED EMBODIMENT

The preferred embodiment will now be described with respect to the drawings. To simplify the description, any numeral identifying an element in one figure will represent the same element in any other figure.

Figure 1:
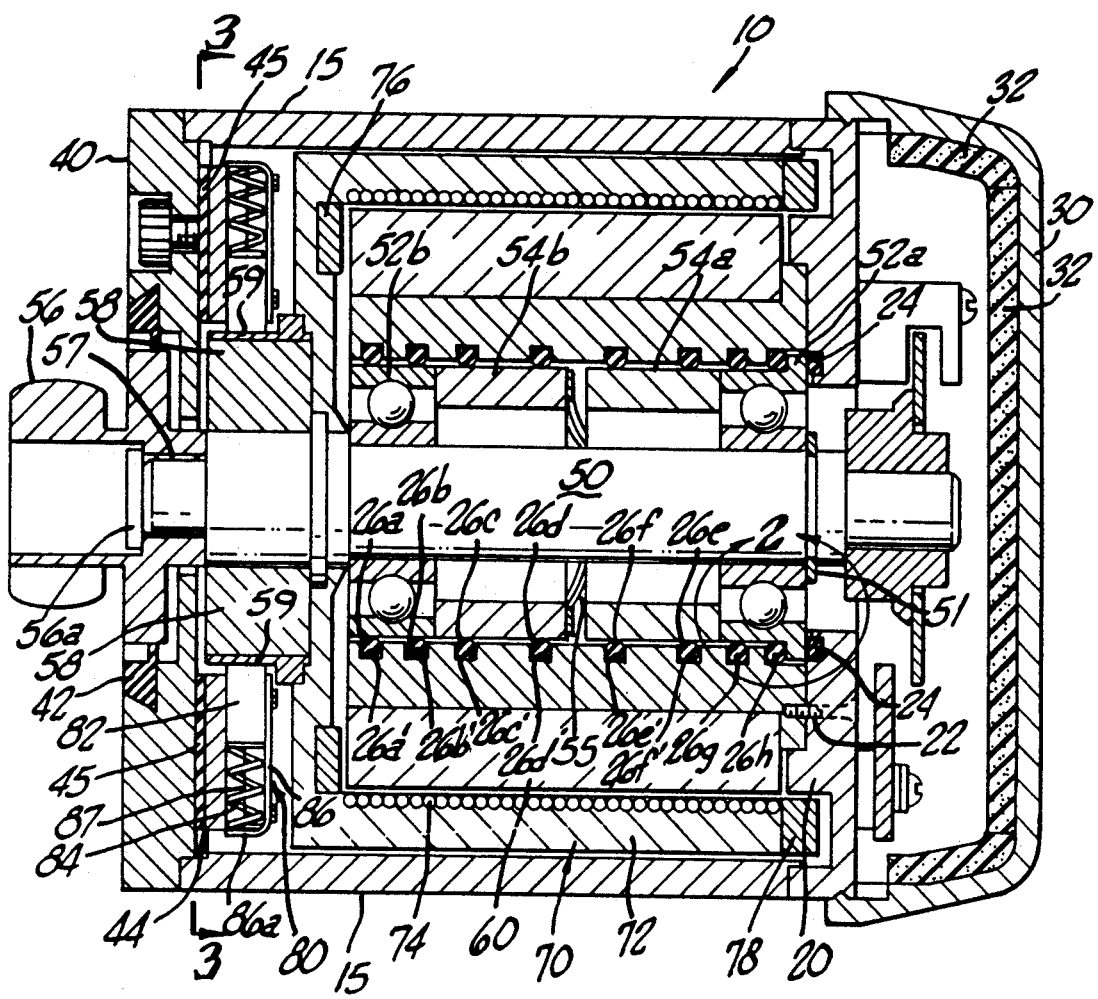
FIG. 1 is a sectional side elevation view of an electric motor according to the present invention.

FIG. 1 illustrates a sectional side elevation view of an electric motor modified according to the present invention. Except for the modifications, the motor 10 is an electric motor, this particular motor being a D.C. Servo model which produces 80 oz-in at 1440 rpm available from Magnetic Technology Inc., Canoga Park, Calif. The motor 10 is essentially comprised of an outer case 15, a rear endcap 20, a front endcap 40, a rotor shaft 50, magnetic field assembly 60, an armature assembly 70, and the brush assembly 80. The magnetic field assembly 60 is attached to the endcap 20 by a plurality of screws 22, the endcap 20 being secured to the motor case 15.

The armature assembly 70 is comprised of an epoxy cup 72 in which the armature windings 74 are embedded. The armature assembly 70 is molded to the commutator 58, both of which are molded onto the shaft 50 and rotate therewith. The armature assembly 70 has a cylindrical shape positioned coaxially with the rotor shaft 50 and the magnetic field assembly 60. The armature assembly 70 is concentrically positioned between the motor case 15 and the magnetic field assembly 60.

The armature assembly 70 is provided with flat annular or ring shaped brass balancing plates 76 and 78. The front balancing plate 76 is positioned along an inner face of the epoxy cup 72 and the rear balancing plate 78 is molded to the rear lip of the epoxy cup 72. By selectively removing some of the metal at certain positions of the balancing plates 76 and 78, the armature assembly 70 may be precisely balanced. Such precise balance is desired when the 10 motor is adapted with the vibration isolation means described below.

Electrical contact is provided by the brush assembly 80 which includes brushes 82 biased by springs 84 against the commutator 58 attached to the shaft 50. The brush assembly 80 is mounted to the front endcap 40 by a brush mount assembly 44, the brush mount assembly 44 being preferably constructed from a non-metallic resilient material such as neoprene to isolate the motor case 15 from the vibration of the brush assembly 80.

Figure 3:
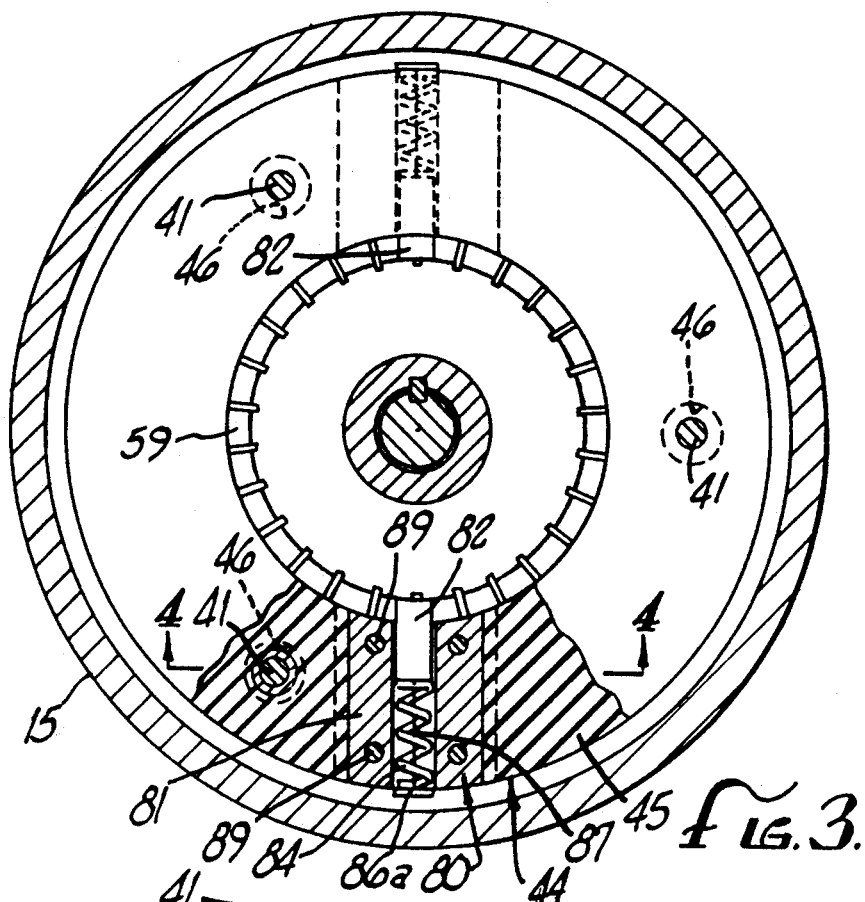
FIG. 3 is a cross sectional view of FIG. 1 taken along line 3—3.
Figure 4:
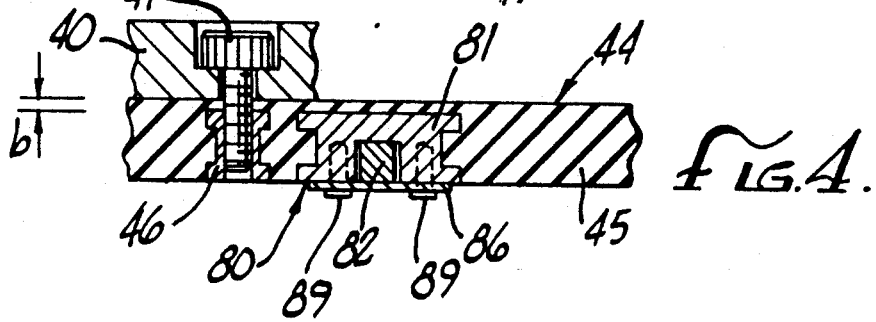
FIG. 4 is a cross sectional view of FIG. 3 taken along line 4—4.

Details of a preferred construction for the brush mount assembly 44 and brush assembly 80 are illustrated in FIGS. 3 and 4. The brush mount assembly 44 is comprised of an annular or flat donut-shaped ring portion 45 constructed from a resilient material, such as neoprene, having high vibration dampening properties. A plurality of threaded eyelets 46 are embedded in the annular ring 45 and spaced thereabout. Mounting screws 41, passing through corresponding holes in the front cap 40, engage the threaded eyelets 46 and secure the annular ring 45 to the front cap 40. As best viewed in FIG. 4, the eyelet 46 is recessed within the annular ring 45 to maintain a spacing "b" of neoprene material for vibration isolation of the eyelet 46 and the front cap 40.

The brush assembly 80 is comprised of a housing 81 which is embedded in the annular ring 45 in a recessed position to maintain a spacing "b" of neoprene material for vibration isolation of the housing 81 and the front cap 40. The housing 81 includes a radial channel or cavity for the brush (contact) 82. A spring 84 urges the brush 82 into contact with the copper contacts 59 of the commutator 58. A cap plate 86 covers the brush channel in the housing 81 to contain the brush 82 and spring 84 therein. The cap plate 86 also includes an end flap 86a which encloses the outer end of the brush channel. The cap plate 86 is secured to the brush housing 81 by screws 89.

A flexible wire 87 is attached at one end to the brush 82 and at the other end to the end flap 86a. The wire 87 retains the brush 82 at least partially within the brush channel so that the brushes 82 do not become separated from the brush assembly 80 when the components are disassembled, thereby facilitating assembly. The wire 87 also provides superior electrical connection between the brush 82 and the cap plate 86.

The shaft 50 extends through the front endcap 40 and is connected to a coupling 56 for connection to, for example, the camera film advance mechanism. The coupling 56 is mounted to the shaft 50 by mounting screw 56a and rotationally secured by key 57. A bearing cover 42 is provided between the front endcap 40 and the coupling 56 to inhibit the transmission of noise out through the front endcap 40. The bearing cover 42 is also preferably constructed from an elastic material such as neoprene The bearing cover 42 provides further sound insulation.

An encoder cover 30 is attached to the endcap 20 to close off noise and vibration. A layer of insulation 32 is provided along inside surface of the encoder cover 30 to provide further sound insulation.

The rotor shaft 50 is supported by front and rear ball bearings 52a and 52b with spacers 54a and 54b positioned therebetween. A wave washer 55 is inserted between the spacers 54a and 54b. The ball bearing 52a is secured by a retaining ring 51 on the rear end of the rotor shaft 50. The ball bearings 52a and 52b and the spacers 54a and 54b are mounted to the magnetic field assembly 60 and support the rotor shaft 50.

The electric motor 10 is then modified by providing vibration isolation between (a) the magnetic field assembly 60 and (b) the bearings 52a, 52b and spacers 54a, 54b, the vibration isolation being comprised of a plurality of O-rings 26a, 26b, 26c, 26d, 26e, 26f, 26g, 26h therebetween. Each of the respective O-rings 26a–26g is positioned in a respective channel 26a'–26h' within the inner circumference of the magnetic field assembly.

Figure 2:
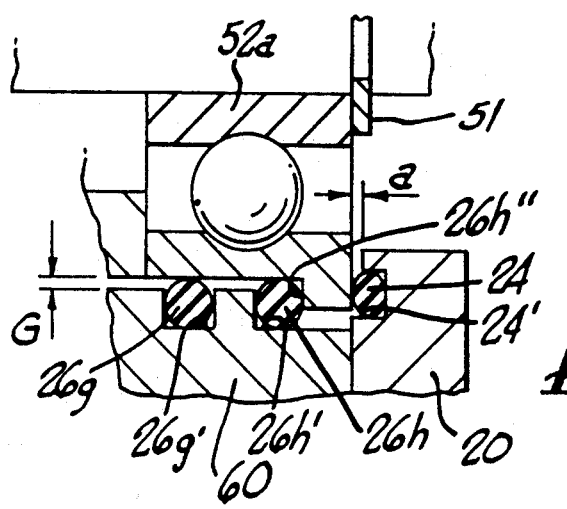
FIG. 2 is a detailed view of a portion of FIG. 1 showing details of the rear bearing support.

FIG. 2 is an enlarged view of a portion of FIG. 1 illustrating construction details.

In FIG. 2 the O-ring 26g is positioned within its corresponding channel 26g' along the inner-circumference of the magnetic field assembly 60. The channels 26a'–26f' corresponding to O-rings 26a–f are of similar configuration. The O-ring 26h is wedged between the channel portions 26h' in the magnetic field assembly 60 and channel portion 26h" in the housing of the ball bearing 52a. The O-rings 26a–h maintain a gap "G" both between the magnetic field assembly 60 and the bearings 52a and 52b and between the magnetic field assembly 60 and the spacers 54a and 54b.

Additional vibration isolation is accomplished by installing an O-ring 24 between the rear ball bearing 52a and the endcap 20. A circular channel 24' of generally rectangular cross-section is formed in the front face of the endcap 20. The channel of 24' extends past the bearing 52a maintaining a gap "a" between the endcap 20 and the bearing 52a. The end O-rings 26h and 24 cooperate with the rear end of bearing 52a to provide axial stability for the bearing assembly.

Unlike the electric motor configurations of the prior art such as in U.S. Pat. No. 3,546,504, the present invention does not use a layer or sheet of elastic material to provide for the noise and vibration insulation, but uses a plurality of O-rings to minimize the area of contact between rotating parts. In contrast to supplying a contact surface over the entire surface area of the insulation layer, an O-ring establishes more of a point contact, minimizing the area of contact through which vibration and/or noise may be produced or propagated.

Alternately the channels 26a'–h' and 24' may be positioned within the bearings or spacer housings.

In contrast to using insulation sheet material which requires special molding or manufacture, the O-rings of the preferred embodiment may be standard off the shelf items available from a variety of vendors.

The preferred O-ring for the motor used in a motion picture camera is made from a nitril compound (such as Buna N), such a material having chemical resistance to fuel and oil which may be encountered in the motor environment. The material also resists breakdown from exposure to ozone, a gas produced by some motors. The material selection will depend upon the particular application as well as the anticipated motor service and environment. The O-ring size and O-ring channel size need to be selected for the particular size motor being modified. For the Magnetic Technology motor illustrated, the O-ring size selected is 0.864" i.d. with a width of 0.070" and a compression strength of 70 durometers. When assembled, the O-rings 26a–h are compressed approximately 0.007". The channels 26a'–26h' are approximately 0.075" wide by 0.0515" deep which would result in a gap "G" of about 0.0115".

There is a tradeoff with respect to the hardness of the O-ring material selected — the softer the material, the more damping, but if the material is too soft, misalignment may occur. Similarly, the number of O-rings needs to be enough to provide adequate support for the components, but the more O-rings, the more surface contact area for vibration/noise transfer.

A standard motor may be readily modified to the above described design by (1) forming a plurality of axially spaced channels (26a'–26h') along the interior circumference of the magnetic field assembly 60, (2) installing a respective O-ring 26a–h within each channel 26a'–26h' in concentric position between the bearing means (the shaft bearings 52a & 52b and spacers 54a & 54b) and the magnetic field assembly 60 to form a gap "G" therebetween, (3) forming a circular channel 24' of rectangular cross section in the front face of the endcap 20, and (4) inserting an O-ring 24 in the circular channel 24' to form a gap "a" between the rear ball bearing 52a and the endcap 20.

An electric motor modified according to the preferred embodiment described above achieves a substantial reduction in operating noise level. Table A lists a group of motors modified according to the preferred embodiment of the present invention comparing noise levels of each motor before and after modification according to the above method.

TABLE A

| Motor Ser. No. | Orig. dBA | Mod. dBA |
|---|---|---|
| 1027A | 37.5 | 28.5 |
| 1208 | 36.0 | 29.5 |
| 1229 | 36.0 | 25.5 |
| 1527 | 34.0 | 24.5 |
| 1603 | 36.5 | 23.5 |

The tests in Table A were conducted in an anechoic chamber with the motor mounted firmly to the mounting pad. The motor was run at 1440 RPM which corresponds to 24 frames per second operation for the motion picture camera. The noise level was measured by a microphone placed one meter from the motor. Test results indicate that the motors modified according to the present invention operated at reduced noise levels. The modified motors tested achieved noise level reductions of at least 6.5 dBA to as much as 13 dBA when compared to unmodified motor operation.

Figure 5:
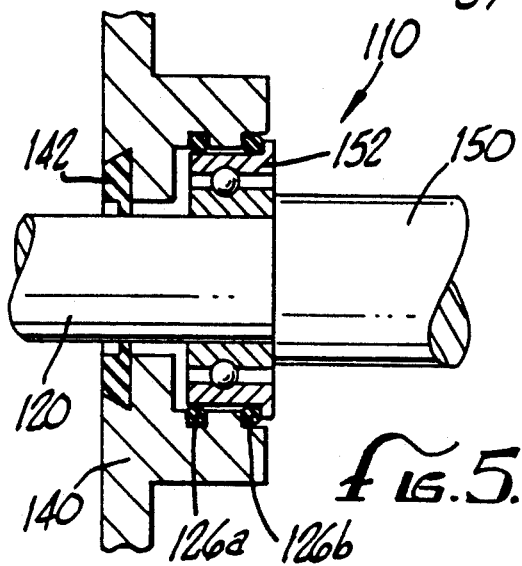
FIG. 5 is a cross sectional view of a bearing support configuration of an alternate embodiment.

FIG. 5 illustrates an alternative embodiment for an electric motor 110 having a more conventional rotor and stator configuration. The motor 150 has a stator (not shown) which is of cylindrical shape and concentrically surrounds the rotor 150. The motor shaft 120 is mounted on a roller bearing 152 which in turn is mounted in the motor housing 140. Vibration isolation means are provided between the motor housing 140 and the bearing 152 comprised of O-rings 126a and 126b positioned in annular channels formed within the inner circumferential surface of the housing 140 adjacent to the bearing 152. The rear bearing (not shown) will also have an O-ring support structure of similar configuration. Other features from the first embodiment may also be incorporated into the alternate motor 110. A bearing cover 142 may be provided between the housing 140 and the shaft 120 to inhibit the transmission of noise out the shaft 120. Though not illustrated, the alternate motor 110 may be modified with the brush assembly isolation means previously described.

Thus, a quiet camera and camera modification method have been shown and described. Though certain examples and advantages have been disclosed, further advantages and modifications may become obvious to one skilled in the art from the disclosures herein. The invention therefore is not to be limited except in the spirit of the claims that follow.

What is claimed is:

1. An electric motor assembly for reducing noise and vibration such as for use in a movie camera, comprising
   a motor case;
   a rotor shaft concentrically positioned along a center axis of the motor case;
   a bearing means connected at either end of the rotor shaft for rotationally supporting the rotor shaft;
   a magnetic field assembly of cylindrical shape connected to the motor case and concentrically positioned between the rotor shaft and the motor case, said magnetic field assembly being supported upon the bearing means and being vibrationally isolated therefrom by a plurality of O-rings concentrically positioned between the bearing means and the magnetic field assembly, the O-rings being axially spaced along the magnetic field assembly;
   an armature winding assembly fixed to the rotor shaft and rotating therewith and being concentrically positioned between the motor case and the magnetic field assembly; and
   means for maintaining axial alignment between the magnetic field assembly and the bearing means comprising a secondary O-ring positioned in a channel located between the magnetic field assembly and the bearing means, the channel having first and second side walls, the first side wall being connected to the bearing means and the second side wall being connected to the magnetic field assembly.

2. A motor assembly as in claim 1 wherein each of said O-rings is positioned in a separate circumferential groove along an inner surface of the magnetic field assembly.

3. A motor assembly as in claim 1 wherein said bearing means includes a first ball bearing at a front end of the rotor shaft, a second ball bearing at a rear end of the rotor shaft and at least one spacer therebetween.

4. A motor assembly for reducing noise and vibration such as for use in a movie camera, comprising
   a motor case;
   a rotor shaft concentrically positioned along a center axis of the motor case;
   a bearing means connected at either end of the rotor shaft for rotationally supporting the rotor shaft;
   a magnetic field assembly of cylindrical shape connected to the motor case and concentrically positioned between the rotor shaft and the motor case, said magnetic field assembly being supported upon the bearing means and being vibrationally isolated therefrom by a plurality of O-rings concentrically positioned between the bearing means and the magnetic field assembly, the O-rings being axially spaced along the magnetic field assembly; and
   an armature winding assembly fixed to the rotor shaft and rotating therewith and being concentrically positioned between the motor case and the magnetic field assembly,
   wherein said magnetic field assembly is fixed to the motor case through an endcap, the magnetic field assembly being fixedly attached at its rearward end to the endcap which in turn is fixedly attached to the motor case.

5. A motor assembly as in claim 4 wherein said endcap comprises a circular disk having a central hole, the disk being coaxially positioned with and in a plane perpendicular to the axis of the rotor shaft, the endcap being constructed and arranged so as to avoid contact with either the rotor shaft or the bearing means.

6. A motor assembly as in claim 5 further comprising an end O-ring positioned between a rear end of the bearing means and the endcap for establishing separation therebetween.

7. A motor assembly for reducing noise and vibration such as for use in a movie camera, comprising
   a motor case;

a rotor shaft concentrically positioned along a center axis of the motor case;

a bearing means connected at either end of the rotor shaft for rotationally supporting the rotor shaft;

a magnetic field assembly of cylindrical shape connected to the motor case and concentrically positioned between the rotor shaft and the motor case, said magnetic field assembly being supported upon the bearing means and being vibrationally isolated therefrom by a plurality of O-rings concentrically positioned between the bearing means and the magnetic field assembly, the O-rings being axially spaced along the magnetic field assembly; and an armature winding assembly fixed to the rotor shaft and rotating therewith and being concentrically positioned between the motor case and the magnetic field assembly, wherein said bearing means includes a front bearing at a front end of the rotor shaft, a rear bearing at a rear end of the rotor shaft and wherein said magnetic field assembly is connected to the motor case through an endcap, the magnetic field assembly being fixedly attached at its rearward end to the endcap which in turn is fixedly attached to the motor case, said endcap comprising a circular disk having a central hole, the disk positioned coaxially with the rotor shaft and rearward of the rear bearing, the endcap being constructed and arranged so as to avoid contact with either the rotor shaft or the rear bearing and wherein an end O-ring is positioned between the endcap and the rear bearing, the end cap having a channel in its front surface adjacent the rear being for accommodating the end O-ring.

8. A motor assembly for reducing noise and vibration such as for use in a movie camera, comprising a motor case;

a rotor shaft concentrically positioned along a center axis of the motor case;

a bearing means connected at either end of the rotor shaft for rotationally supporting the rotor shaft;

a magnetic field assembly of cylindrical shape connected to the motor case and concentrically positioned between the rotor shaft and the motor case, said magnetic field assembly being supported upon the bearing means and being vibrationally isolated therefrom by a plurality of O-rings concentrically positioned between the bearing means and the magnetic field assembly, the O-rings being axially spaced along the magnetic field assembly;

an armature winding assembly fixed to the rotor shaft and rotating therewith and being concentrically positioned between the motor case and the magnetic field assembly; and a front endcap fixed to the motor case and a brush mount assembly mounted on the front endcap.

9. A motor assembly as in claim 8 further comprising a coupling connected to said rotor shaft and bearing cover means of soft elastic material positioned to close off any air gap between the front endcap and the coupling for inhibiting transmission of noise out through the front endcap.

10. A motor assembly as in claim 8 wherein the brush mount assembly is comprised of a flat, ring-shaped disk of non-metallic, resilient material within which a brush assembly is mounted, the brush assembly having no metal-to-metal contact with the front endcap.

11. A motor assembly as in claim 10 wherein the brush mount assembly includes a plurality of threaded eyelets embedded in the ring-shaped disk and spaced about a radius, the brush mount assembly being secured to the front endcap by screws engaging the threaded eyelets.

12. A motor assembly as in claim 8 further comprising ring-shaped balancing plates positioned on opposite ends of the armature winding assembly.

13. A synchronous sound movie camera having a film advance mechanism and an electric motor for driving the film advance mechanism, the electric motor comprising a motor case;

a rotor shaft concentrically positioned along a center axis of the motor case;

a bearing means connected at either end of the rotor shaft for rotationally supporting the rotor shaft;

a magnetic field assembly of cylindrical shape connected to the motor case and concentrically positioned between the rotor shaft and the motor case, said magnetic field assembly being supported upon the bearing means and being vibrationally isolated therefrom by a plurality of O-rings concentrically positioned between the bearing means and the magnetic field assembly, the O-rings being axially spaced along the magnetic field assembly; and an armature winding assembly fixed to the rotor shaft and rotating therewith and being concentrically positioned between the motor case and the magnetic field assembly.

14. A quiet electric motor comprising a motor case;

a rotor shaft concentrically positioned along a center axis of the motor case;

a magnetic field assembly of cylindrical shape connected to the motor case and concentrically positioned between the rotor shaft and the motor case;

bearing means connected at either end of the rotor shaft for rotationally supporting the rotor shaft; and an armature winding assembly fixed to the rotor shaft and rotating therewith and being concentrically positioned between the motor case and the magnetic field assembly, wherein said bearing means is supported upon the magnetic field assembly and is vibrationally isolated therefrom by a plurality of O-rings concentrically positioned between the bearing means and the magnetic field assembly, the O-rings being axially spaced along the magnetic field assembly and wherein the magnetic field assembly and the bearing means are separated by a secondary O-ring positioned in a channel located between the magnetic field assembly and the bearing means, the channel having first and second side walls, the first side wall being connected to the bearing means and the second side wall being connected to the magnetic field assembly.

15. An electric motor assembly, comprising a motor case;

a rotor shaft concentrically positioned along a center axis of the motor case;

a bearing means connected at either end of the rotor shaft for rotationally supporting the rotor shaft;

a stator;

a rotor;

a front endcap connected to the motor case;

a brush mount assembly mounted to the front endcap; and a brush assembly mounted to the brush mount assembly, the brush mount assembly being comprised of a flat, ring-shaped disk of non-metallic, resilient material within which the brush assembly is mounted, the brush assembly having no metal-to-metal contact with the front endcap.

16. An electric motor assembly comprising
a motor case;
a rotor shaft concentrically positioned along a center axis of the motor case;
a bearing means connected at either end of the rotor shaft for rotationally supporting the rotor shaft;
a stator;
a rotor;
a front endcap connected to the motor case; and
a brush mount assembly mounted to the front endcap, the brush mount assembly being comprised of a flat, ring-shaped disk of non-metallic, resilient material within which a brush assembly is mounted, the brush assembly having no metal-to-metal contact with the front endcap,
wherein the brush mount assembly includes a plurality of threaded eyelets embedded in the ring-shaped disk and spaced about a radius, the brush mount assembly being secured to the front endcap by screws engaging the threaded eyelets.

17. A motor assembly as in claim 15 wherein the brush assembly comprises a plurality of brush units spaced about an inner perimeter of the ring shaped disk, each brush unit being comprised of (a) a brush contact disposed in a channel, (b) a spring disposed in the channel and biasing the brush contact radially inward, and (c) a wire disposed in the channel and attached at one end to the brush contact and at the other end to the brush unit.

18. A method of modifying an electric motor to reduce its operating noise level comprising the steps of:
vibrationally isolating the magnetic field assembly from the shaft bearings by (1) installing a plurality of O-rings in concentric position between the shaft bearings and the magnetic field assembly and (2) axially spacing the O-rings along the magnetic field assembly;
forming a channel between the magnetic field assembly and one of the shaft bearings, the channel having first and second side walls, the first side wall being connected to the bearing means and the second side wall being connected to the magnetic field assembly; and
installing a secondary O-ring in the channel.

19. A method of modifying an electric motor according to claim 18 further comprising
forming a channel in the inner circumferential surface of the magnetic assembly for receipt of each O-ring.

20. A method of modifying an electric motor to reduce its operating noise level comprising the steps of:
vibrationally isolating the magnetic field assembly from the shaft bearings by (1) installing a plurality of O-rings in concentric position between the shaft bearings and the magnetic field assembly, (2) axially spacing the O-rings along the magnetic field assembly, (3) forming a channel between the magnetic field assembly and one of the shaft bearings, the channel having first and second side walls, the first side wall being connected to the bearing means and the second side wall being connected to the magnetic field assembly, and (4) installing a secondary O-ring in the channel.

21. A method of modifying an electric motor to reduce its operating noise level comprising the steps of:
vibrationally isolating the magnetic field assembly from the shaft bearings by (1) installing a plurality of O-rings in concentric position between the shaft bearings and the magnetic field assembly, (2) axially spacing the O-rings along the magnetic field assembly, and (3) providing separation between the rear bearing and the rear endcap by installing an end O-ring between a rear end of the rear bearing and the endcap.

22. A method of modifying an electric motor to reduce its operating noise level comprising the steps of:
vibrationally isolating the magnetic field assembly from the shaft bearings by (1) installing a plurality of O-rings in concentric position between the shaft bearings and the magnetic field assembly and (2) axially spacing the O-rings along the magnetic field assembly and
installing the brush assembly with no metal-to metal contact with the front endcap by replacing the brush mount assembly with an assembly comprised of a disk of non-metallic, resilient material within which the brush assembly is mounted and securing the disk to the front endcap via a plurality of eyelets recessed within the disk.

23. A method of modifying an electric motor according to claim 21 further comprising
forming a channel in the inner circumferential surface of the magnetic assembly for receipt of each O-ring.

24. A method of modifying an electric motor according to claim 22 further comprising
forming a channel in the inner circumferential surface of the magnetic assembly for receipt of each O-ring.

* * * * *